Feb. 28, 1956
C. K. GREENE
2,736,096
RADIO PLOTTER
Filed Oct. 29, 1951
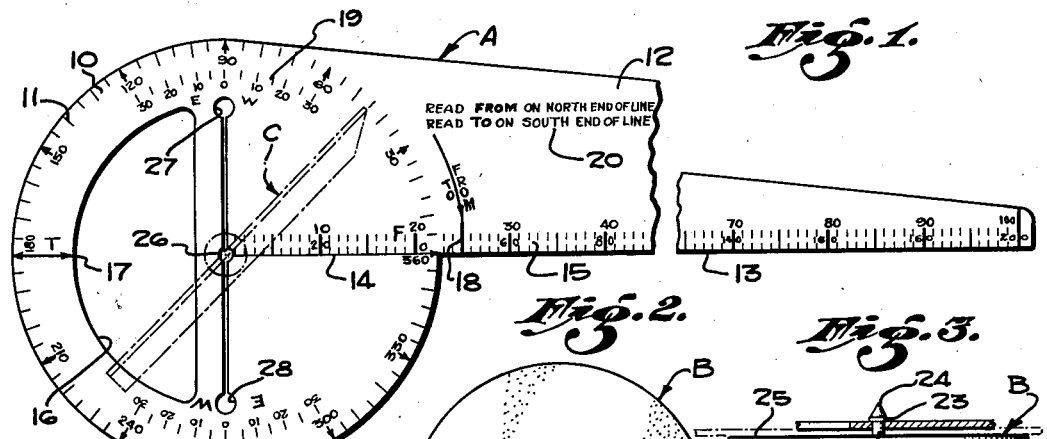
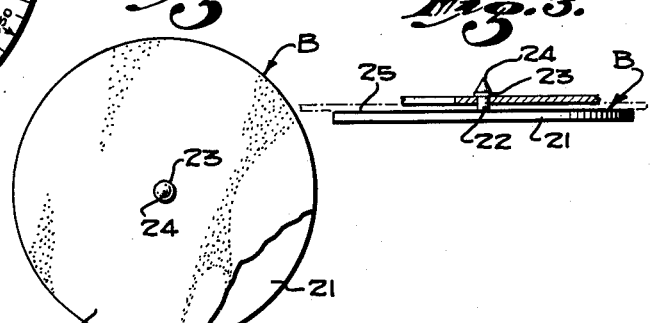
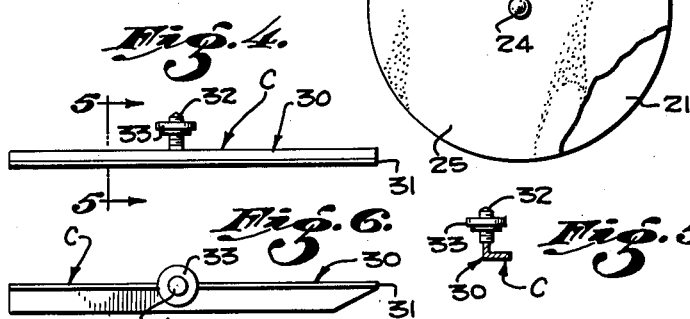
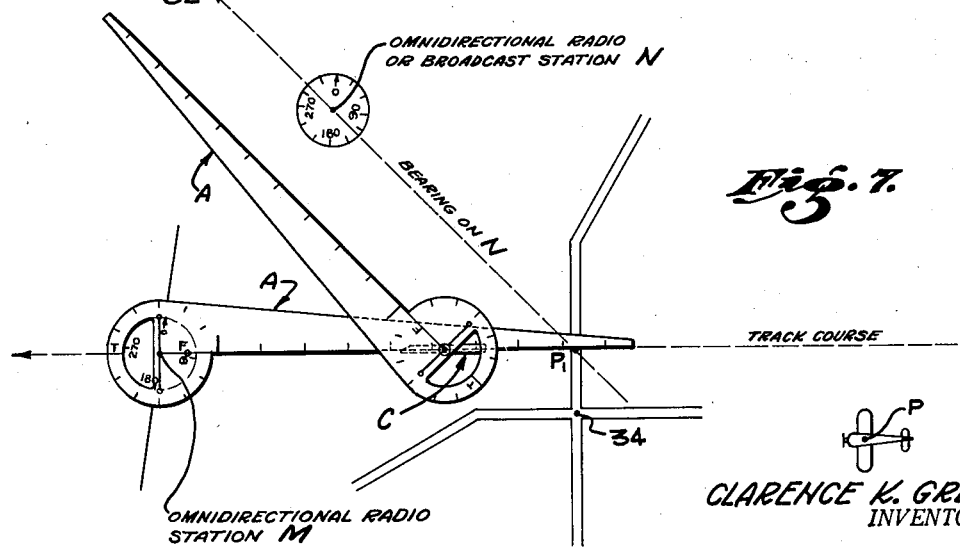
CLARENCE K. GREENE,
INVENTOR.
BY
ATTORNEY

United States Patent Office 2,736,096
Patented Feb. 28, 1956

2,736,096

RADIO PLOTTER

Clarence K. Greene, Cananea, Mexico

Application October 29, 1951, Serial No. 253,685

4 Claims. (Cl. 33—75)

The present invention relates to a plotting device for use in navigation, and is more particularly concerned with a device for radio direction plotting in aerial navigation.

It is one object of the herein described invention to provide a plotting device which may be utilized in connection with omnidirectional radio range charts.

According to the general concept of the invention, it is proposed to provide a radio plotter which can be utilized by aircraft pilots, especially in small airplanes where there is no chart table and there is a dearth of space and accommodations for the usual navigating procedures.

A further object is to provide a plotting device which may be releasably attached to a chart at a selected omnidirectional radio range station positioned and utilized with the station compass rose appearing on the chart for the selected station for solving navigational problems without the necessity of drawing course and bearing lines, and the like in the usual manner on the chart.

A further object is to provide plotting devices which are so arranged that they may be utilized singly, and in combination depending upon the conditions and the result to be determined; and which may be utilized with indicated omnidirectional radio stations as well as broadcasting stations generally.

Still another object is to provide an improved pivot construction which may be affixed at a selected point on a navigational chart, for utilization with an associated part of a plotting device.

Briefly, the invention comprises a pair of complementary members, the first of these members comprising a transparent disc or compass rose portion with a projecting distance calibrated arm, this element being arranged for pivotal mounting on the other or second complementary member.

The latter complementary member may assume one of two different forms of construction. In one form, this member comprises a disc having a projecting pivot pin which may be pushed through the chart at the center of the chart compass rose of an omnidirectional radio station, or the point of location of any other known radio station, and secured to the chart as by an adhesive so as to form a pivot for the first member. In another form, the construction of the second complementary member comprises a bar arranged to be pivotally angularly positioned about the center of the compass rose of the first member, and clamped in adjusted position. This bar is provided with a straight edge for sliding engagement with an associated straight edge, whereby the associated first device may be movingly shifted along the associated straight edge to various positions with the arm extending at the adjusted angle of the bar of the second member.

Further objects of the invention will be brought out in the following part of the specification, wherein detailed description is for the purpose of fully disclosing the invention without placing limitations thereon.

Referring to the accompanying drawings, which are for illustrative purposes only:

Fig. 1 is a plan view of one of the complementary members embodied in the device of the present invention;

Fig. 2 is one from of a complementaly member adapted to be associated with the member shown in Fig. 1;

Fig. 3 is an enlarged fragmentary view showing the members of Fig. 1 and Fig. 2 in assembled relation;

Fig. 4 is an elevational view of another form of construction of a complementary member, and showing the manner in which it is adapted to be associated with the member shown in Fig. 1;

Fig. 5 is a transverse sectional view, taken substantially on line 5—5 of Fig. 4;

Fig. 6 is a plan view of the member disclosed in Fig. 4; and

Fig. 7 is a view diagrammatically illustrating the manner in which the present invention is utilized in connection with a navigational chart.

Referring generally to the drawings, for illustrative purpose there is shown in Fig 1 a member A of a radio plotter, which is adapted to be coordinated in assembled relation with one or more complementary members, such as member B as generally disclosed in Fig. 2, or member C as generally disclosed in Figs. 4, 5 and 6.

Referring again to Fig. 1, the member A is constructed of suitable material, preferably a transparent material such as may be available in any one of a number of available plastics. This member comprises a 360 degree protractor portion 10 provided with peripheral compass graduations 11, and provided with an elongate projecting arm 12. This arm is shown as being tapered towards its outer end, and is provided with a lateral straight edge 13 which extends radially from the center of the protractor portion 10 and is projected to the center by a continuation line 14. Adjacent the edge 13, the arm is calibrated with distance graduations 15. In the present instance, the distance indicating indicia are two values, one value being twice the other value to take care of charts of different scale.

As shown in Fig. 1, it will be noted that approximately one-half of the protractor portion is of solid construction, while diametrically opposite the continuation line 14, the protractor portion is provided with an opening 16 of substantially segmental shape. It will be apparent that with this arrangement, if the center of the protractor is positioned at the center of the chart compass rose, the protractor portion may be set either in accordance with a reference point as indicated by the numeral 17, or by means of the continuation line 14. These two reference positions are indicated respectively by the letters "T" and "F" which connote bearing directions "To" and "From" the omnidirectional station. Depending upon which reference is utilized, the arm 12 will be extended in opposite directions.

In certain aeronautical charts, the radio station compass rose is of larger diameter and arranged with concentric graduated scales in which the degree indications at a particular point are complementary. That is, for example, if the indication on one scale is 90 degrees, the indication of the other scale at this point would be 270 degrees. In order to adapt the present invention for utilization with charts having compass roses of this type, the arm 12 is provided with a locus line 18 which is so positioned as to lie between the concentric scales or graduations of the double compass rose, and it will be noted that inwardly adjacent to this line the indicium "To" is placed, whereas outwardly positioned adjacent this line the indicium "From" is placed.

In some instances, the particular chart available to the pilot of the aircraft may not show the latest omnidirectional stations, so that at this point on the chart there would be no compass rose available for utilization. In such case, a magnetic variation scale 19 having degree graduations extending on opposite sides of a zero point and having "E" and "W" indicia to indicate east or west variation is provided for enabling use of the protractor portion for establishing a zero line of reference on the chart. This line is oriented to take into account the magnetic variation at this particular locality. Readings under these circumstances would be taken on the compass graduations 11 of the protractor, and when readings are taken at the north end of the zero reference line, the direction is considered as "From" the station, and when taken from the south end of the line the readings are considered as "To" the station, as expressed in the instructions indicated by numeral 20 inscribed on the projecting arm 12.

Referring to Fig. 2, member B comprises a disc 21 which is preferably constructed of a substantially rigid material, and may be of thin metal. Centrally, the disc 21 has secured thereto a pin 22, this pin projecting above the disc and being provided with a head 23 which terminates in a sharp point 24. The adjacent surface of the disc is covered with a layer of adhesive 25.

The pin 22 is arranged to form a pivotal support for member A, and in order that members A and B may be readily and quickly attached and detached, the protractor portion 10 at its center is provided with a central opening 26 and outwardly spaced diametrically opposite openings 27 and 28, which are interconnected by a slit 29. This construction permits the head portion 23 of the pin 22 to be snapped through the opening 26 so as to assemble and disassemble the members A and B, when desired.

It is contemplated that members B, such as just described, will be mounted on the chart at the point positions of selected radio stations. In order to mount the member B at the proper point, the point 24 of the pin 22 is utilized to prick the surface of the chart at the point location of the station. The pin 22 is then pushed through the chart at this point from the reverse side, until the adhesive surface 25 engages the back surface of the chart and thus secures the disc in operative position with the pin 22 projecting above the upper surface of the chart at the station location in readiness to form a pivotal mounting at the station or stations for association with member A, whenever desired.

For adapting member A for certain operations, complementary member C may be utilized. Member C, as shown in Figs. 4, 5 and 6, comprises an elongate bar 30, in this instance of right angled cross-section, which has one of its flanges cut on an angle at one end in order to form a pointer 31. Between its ends, the bar 30 has affixed thereto a threaded pin 32 adapted to operatively receive an associated nut 33. With this arrangement, member C may be pivotally mounted on the under side of the protractor portion 10 by inserting the pin 32 through the central opening 26 of the protractor. The nut 33 will then retain the pivot pin 32 against removal. If the nut 33 is left untightened, it will be apparent that the bar 30 may be angularly positioned by moving the pointer 31 over the compass graduations 11 to a desired position, for example, as shown in dotted lines in Fig. 1. The bar may then be clamped in this position simply by tightening the nut 33. The bar 30 thus provides a straight edge which may be utilized to slidingly guide and orient the movement of member A along an associated straight edge during certain uses of the plotter, as will hereinafter be illustrated in detail.

Referring now to Fig. 7, several exemplary uses and manners of employing the invention under different conditions will now be explained.

In brief, the equipment in aircraft for utilization in connection with omnidirectional radio range systems comprises a frequency tuning dial which permits tuning in the desired station; a course selector; a To-From indicator which indicates whether the compass direction on the course selector is "To" or "From" the station to which the radio equipment is tuned; and a left-right indicator arranged to indicate to the pilot whether the plane is off course to the right or left of the selected course.

*Case A.*—To determine the approximate position of the aircraft with reference to a single omnidirectional radio station. Let it be assumed, for example, that the aircraft is at position P with its course selector set at 255 degrees. With omnidirectional radio station M tuned in, the pilot will note that the to-from indicator will read "To," and the left-right indicator will read "Right." The pilot thus knows that he is approaching the station M and that his desired track course is to his right. The pilot will then veer to the right until his left-right indicator reads zero. With the radio plotter pivotally mounted on member C for swinging movement about the compass rose center of station M, the arm 12 thereof is moved until the point 17 bearing the indicium "T" is at the compass graduation 255 degrees. The pilot now knows that he is somewhere along the indicated track course. By picking up some indicated landmark on the chart, such as the indicated road intersection 34, the pilot can now determine that he is approximately at a position indicated at point P' on the track course, and that his distance from station M is approximately as indicated by the distance graduations on the arm 12 at point P'.

*Case B.*—Obtaining position by cross-bearings from two omnidirectional radio stations. Again, let it be assumed that the aircraft is, for example, at a position P', which may be on the track course, or represent a bearing taken on station M. Such bearing may be determined by tuning in the station and then varying the course selector until the left-right indicator reads zero. The radio plotter is set on the track course or bearing, as the case may be. A bearing is then taken on a second omnidirectional radio station, for example, station N, and a second radio plotter set on its compass rose in a manner similar to that at station M. The point of intersection of the edges 13—13 of the two projecting arms will indicate the aircraft position, and the distance from each station will be respectively indicated by the distance graduations on the arms of the respective plotters.

*Case C.*—As an alternative to the procedure outlined in Case B, the point P' may also be located by utilizing one plotter as previously explained to locate the track or bearing line of station M. A second plotter, fitted with member C is utilized, and the bar 30 thereof is set to the bearing noted for station N. This may be obtained as previously explained in case station N is omnidirectional, or in the case of a conventional broadcast station by means of an automatic direction finder or other suitable equipment. The bar 30 of the second plotter is then applied to the lateral edge 13 of the plotter for station M as shown in full lines in Fig. 7 and moved along this edge until the corresponding lateral edge of the second plotter is on the point indicating station N. Point P' will then be at the center of the protractor of the second plotter, and the distances to the respective stations will be as indicated by the distance graduations on the arms of the respective plotters.

Various modifications may suggest themselves to those skilled in the art without departing from the spirit of my invention, and hence, I do not wish to be restricted to the specific forms shown or uses mentioned, except to the extent indicated in the appended claims.

I claim:

1. A device of the character described, comprising the combination of: a protractor having a slit intercepting a central opening; an arm integrally formed with and projecting from said protractor, said arm having a lateral edge extending radially from said central opening calibrated in distance graduations; a pivot member having a headed end; and a mounting disc at the other end of said pivot member, having an adhesive surface, said pivot member being adapted for mounting on a chart by engaging said adhesive surface against a chart surface at a desired position on the chart to enable effecting snap action connection and disconnection of the protractor with said pivot member at a desired position by inserting the pivot member head through said central opening.

2. A radio plotter comprising: two superposed and relatively rotatable members, the upper of which is transparent and is inscribed with compass graduations, said lower member having a projection adapted to pierce the material of an associated chart; a head portion on said projection adapted to be inserted into a central opening of the upper member with a snap action to form a connectable and disconnectable pivot therefore; means for securing the lower member against rotation with respect to said associated chart; and a projecting distance calibrated arm rotatable with said upper member.

3. In a radio plotter, a pivot structure adapted for mounting on a navigational chart, said structure comprising: a disc member; a pin projecting from one surface of said disc member, said pin having an enlarged head terminating in a piercing point adapted to be pushed through the chart at a desired location; and means for securing the disc member to the back surface of the chart with the head of the pin positioned above the upper chart surface.

4. A device of the character described, comprising the combination of: a disc having a slit intercepting a central opening; an arm integrally formed with and projecting from said disc, said arm having a lateral edge extending radially from said central opening calibrated in distance graduations; a pivot member having a headed end; and a mounting disc at the other end of said pivot member, having an adhesive surface, said pivot member being adapted for mounting on a chart by engaging said adhesive surface against a chart surface at a desired position on the chart to enable pivotal mounting of the disc on the upper surface of the chart by releasably inserting the pivot member head through said central opening with a snap action.

References Cited in the file of this patent

UNITED STATES PATENTS

| | | |
|---|---|---|
| 635,596 | Herman | Oct. 24, 1899 |
| 1,205,401 | Smith | Nov. 21, 1916 |
| 1,292,337 | Lindberg | Jan. 21, 1919 |
| 1,294,768 | Carlson | Feb. 18, 1919 |
| 1,917,282 | Woodside | July 11, 1933 |
| 1,985,907 | Weems | Jan. 1, 1935 |
| 2,004,951 | Jensen | June 18, 1935 |
| 2,013,603 | Dalton | Sept. 3, 1935 |
| 2,101,365 | Erickson | Dec. 7, 1937 |
| 2,159,562 | McCluskey | May 23, 1939 |
| 2,238,190 | Sawtelle | Apr. 15, 1941 |
| 2,316,534 | Parks | Apr. 13, 1943 |
| 2,339,516 | Quillen | Jan. 18, 1944 |
| 2,453,261 | Peters | Nov. 9, 1948 |
| 2,499,721 | Cassity | Mar. 7, 1950 |
| 2,505,149 | Schoenberg | Apr. 25, 1950 |
| 2,545,935 | Warner | Mar. 20, 1951 |

FOREIGN PATENTS

| | | |
|---|---|---|
| 167,075 | Great Britain | Aug. 4, 1921 |
| 429,651 | Great Britain | June 4, 1935 |
| 807,692 | France | Oct. 19, 1936 |